United States Patent
Wang et al.

(10) Patent No.: US 12,295,235 B2
(45) Date of Patent: May 6, 2025

(54) DISPLAY PANEL, MANUFACTURING METHOD AND DISPLAY DEVICE

(71) Applicant: BOE Technology Group Co., Ltd., Beijing (CN)

(72) Inventors: Hejin Wang, Beijing (CN); Zewen Bo, Beijing (CN); Dalin Xiang, Beijing (CN); Bingwei Wang, Beijing (CN); Caiyu Qu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 67 days.

(21) Appl. No.: 17/799,394

(22) PCT Filed: Nov. 12, 2021

(86) PCT No.: PCT/CN2021/130286
§ 371 (c)(1),
(2) Date: Aug. 12, 2022

(87) PCT Pub. No.: WO2022/227495
PCT Pub. Date: Nov. 3, 2022

(65) Prior Publication Data
US 2024/0188372 A1    Jun. 6, 2024

(30) Foreign Application Priority Data
Apr. 30, 2021 (CN) ................... 202110482195.8

(51) Int. Cl.
*H10K 59/40* (2023.01)
*G06F 3/044* (2006.01)
(Continued)

(52) U.S. Cl.
CPC .......... *H10K 59/40* (2023.02); *G06F 3/0446* (2019.05); *G06F 21/32* (2013.01); *H10K 59/131* (2023.02);
(Continued)

(58) Field of Classification Search
CPC ..... H10K 50/828; H10K 50/826; H10K 59/40
See application file for complete search history.

(56) References Cited

U.S. PATENT DOCUMENTS

2016/0306470 A1    10/2016   Park et al.
2021/0201791 A1*    7/2021   Fukasawa ............ H10K 59/131
(Continued)

FOREIGN PATENT DOCUMENTS

| CN | 107512050 A | 12/2017 |
|---|---|---|
| CN | 111722757 A | 9/2020 |
| CN | 113224122 A | 8/2021 |

OTHER PUBLICATIONS

PCT/CN2021/130286 international search report and written opinion.

*Primary Examiner* — Evren Seven
(74) *Attorney, Agent, or Firm* — IPro, PLLC

(57) ABSTRACT

The present disclosure provides a display panel, a manufacturing method thereof, and a display device. The display panel includes: a display functional layer; a functional electrode layer located at a side of the display functional layer; and a transparent conductive layer located at a side of the functional electrode layer away from the display functional layer and electrically coupled to the functional electrode layer, the transparent conductive layer at least including a metal layer and a transparent metal oxide conductive layer, and a thickness of the transparent metal oxide conductive layer being greater than a thickness of the metal layer.

20 Claims, 4 Drawing Sheets

(51) Int. Cl.
*G06F 21/32* (2013.01)
*H10K 59/131* (2023.01)
*H10K 59/80* (2023.01)
*H10K 102/00* (2023.01)

(52) U.S. Cl.
CPC ....... *H10K 59/873* (2023.02); *H10K 59/8792* (2023.02); *H10K 2102/351* (2023.02)

(56) References Cited

U.S. PATENT DOCUMENTS

| | | | |
|---|---|---|---|
| 2021/0202592 A1* | 7/2021 | Kim | ........................ H10K 59/87 |
| 2021/0286468 A1 | 9/2021 | Xie et al. | |
| 2022/0093708 A1* | 3/2022 | Cho | ........................ H10K 59/38 |
| 2022/0100303 A1* | 3/2022 | Lee | ........................ G06F 3/0416 |

* cited by examiner

DISPLAY PANEL, MANUFACTURING METHOD AND DISPLAY DEVICE

CROSS-REFERENCE TO RELATED APPLICATION

This application is the U.S. national phase of PCT Application No. PCT/CN2021/130286 filed on Nov. 12, 2021, which claims a priority of the Chinese patent application No. 202110482195.8 filed on Apr. 30, 2021, which is incorporated herein by reference in its entirety.

TECHNICAL FIELD

The present disclosure relates to the field of display technology, in particular to a display panel, a manufacturing method thereof, and a display device.

BACKGROUND

Organic Light-Emitting Diode (OLED) display devices and Quantum Dot Light-Emitting Diode (QLED) display devices have become a promising next-generation display technology due to such advantages as being thin and light, a wide viewing angle, self-luminescence, continuously adjustable color, low manufacture cost, rapid response, low power consumption, a low driving voltage, a wide operating temperature, a simple manufacture process, high luminous efficiency, and being flexible.

In the related art, functions such as fingerprint identification or touch control are integrated in an OLED display screen, resulting in such problems as a low signal-to-noise ratio of a signal.

SUMMARY

An object of the present disclosure is to provide a display panel, a manufacturing method thereof, and a display device, so as to improve a signal-to-noise ratio of a sensing signal.

The present disclosure provides the following technical solutions.

In one aspect, the present disclosure provides in some embodiments a display panel, including: a display functional layer: a functional electrode layer located at a side of the display functional layer; and a transparent conductive layer located at a side of the functional electrode layer away from the display functional layer and electrically coupled to the functional electrode layer, the transparent conductive layer at least including a metal layer and a transparent metal oxide conductive layer, and a thickness of the transparent metal oxide conductive layer being greater than a thickness of the metal layer.

In a possible embodiment of the present disclosure, the transparent conductive layer includes the transparent metal oxide conductive layer, the metal layer and the transparent metal oxide conductive layer laminated one on another; or the transparent conductive layer includes the transparent metal oxide conductive layer and the metal layer laminated one on another, and the metal layer is located at a side of the transparent metal oxide conductive layer close to the display functional layer.

In a possible embodiment of the present disclosure, a ratio of the thickness of the transparent metal oxide conductive layer to the thickness of the metal layer ranges from 5 to 7.

In a possible embodiment of the present disclosure, the thickness of the metal layer ranges from 10 Å to 250 Å.

In a possible embodiment of the present disclosure, the display panel further includes: a metal wiring layer located at a light-exiting side of the display functional layer and including a plurality of metal lines; and an insulation layer located at a side of the metal wiring layer away from the display functional layer. The functional electrode layer is located at a side of the insulation layer away from the display functional layer, and the functional electrode layer is electrically coupled to each metal line through a via hole penetrating through the insulation layer.

In a possible embodiment of the present disclosure, the functional electrode layer includes a plurality of touch electrodes and/or a plurality of fingerprint identification electrodes.

In a possible embodiment of the present disclosure, the transparent conductive layer includes a plurality of transparent electrode blocks independent of each other, the touch electrodes correspond to the transparent electrode blocks respectively, and an orthogonal projection of each touch electrode onto the display functional layer is within an orthogonal projection of the corresponding transparent electrode block onto the display functional layer.

In a possible embodiment of the present disclosure, the touch electrode is a metal grid.

In a possible embodiment of the present disclosure, the display functional layer includes a plurality of sub-pixels, the orthogonal projection of each touch electrode onto the display functional layer covers at least one sub-pixel, and an orthogonal projection of the metal grid onto the display functional layer is located between adjacent sub-pixels.

In a possible embodiment of the present disclosure, the functional electrode layer includes P touch electrodes arranged in an array form, and the metal wiring layer includes P metal lines coupled to the touch electrodes respectively, where P is an integer greater than 1.

In a possible embodiment of the present disclosure, the transparent conductive layer includes a plurality of transparent electrode blocks independent of each other, the fingerprint identification electrodes correspond to the transparent electrode blocks respectively, and an orthogonal projection of each fingerprint identification electrode onto the display functional layer is within an orthogonal projection of the corresponding transparent electrode block onto the display functional layer.

In a possible embodiment of the present disclosure, the display functional layer includes a plurality of sub-pixels, and an orthogonal projection of each fingerprint identification electrode onto the display functional layer covers one sub-pixel or a part of one sub-pixel.

In a possible embodiment of the present disclosure, the functional electrode layer includes the fingerprint identification electrodes arranged in M columns, the metal wiring layer includes 2M metal lines extending in a column direction, even-numbered fingerprint identification electrodes in an $i^{th}$ column are coupled to a $(2i)^{th}$ metal line, and odd-numbered fingerprint identification electrodes in the $i^{th}$ column are coupled to a $(2i-1)^{th}$ metal line, or the even-numbered fingerprint identification electrodes in the $i^{th}$ column are coupled to the $(2i-1)^{th}$ metal line, and the odd-numbered fingerprint identification electrodes in the $i^{th}$ column are coupled to the $(2i)^{th}$ metal line, where i is an integer greater than or equal to 1 and less than or equal to M; or the functional electrode layer includes the fingerprint identification electrodes arranged in N rows, the metal wiring layer includes 2N metal lines extending in a row direction, even-numbered fingerprint identification electrodes in a $j^{th}$ row are coupled to a $(2j)^{th}$ metal line, and odd-numbered fingerprint identification electrodes in the $j^{th}$ row are coupled to a $(2j-1)^{th}$ metal line, or the even-numbered fingerprint identification electrodes in the $j^{th}$ row are coupled to the $(2j-1)^{th}$ metal line, and the odd-numbered fingerprint identification electrodes in the $j^{th}$ row are coupled to the $(2j)^{th}$ metal line, where j is an integer greater than or equal to 1 and less than or equal to N.

In a possible embodiment of the present disclosure, a light transmittance of the transparent conductive layer is not greater than 60%.

In a possible embodiment of the present disclosure, the light transmittance of the transparent conductive layer ranges from 40% to 60%.

In a possible embodiment of the present disclosure, the display panel further includes a passivation layer located at a side of the transparent conductive layer away from the display functional layer.

In a possible embodiment of the present disclosure, the display panel further includes a planarization layer located at a side of the transparent conductive layer away from the display functional layer and having a refractive index of 1.4 to 1.6.

In a possible embodiment of the present disclosure, the display panel further includes a black matrix located at a side of the transparent conductive layer away from the display functional layer, and an orthogonal projection of the metal line onto the display functional layer is within an orthogonal projection of the black matrix onto the display functional layer.

In a possible embodiment of the present disclosure, the display panel further includes an overcoat layer located at a side of the transparent conductive layer away from the display functional layer.

In another aspect, the present disclosure provides in some embodiments a display device, including the above-mentioned display panel and a driving chip coupled to the functional electrode layer through the metal lines.

Figure 1:
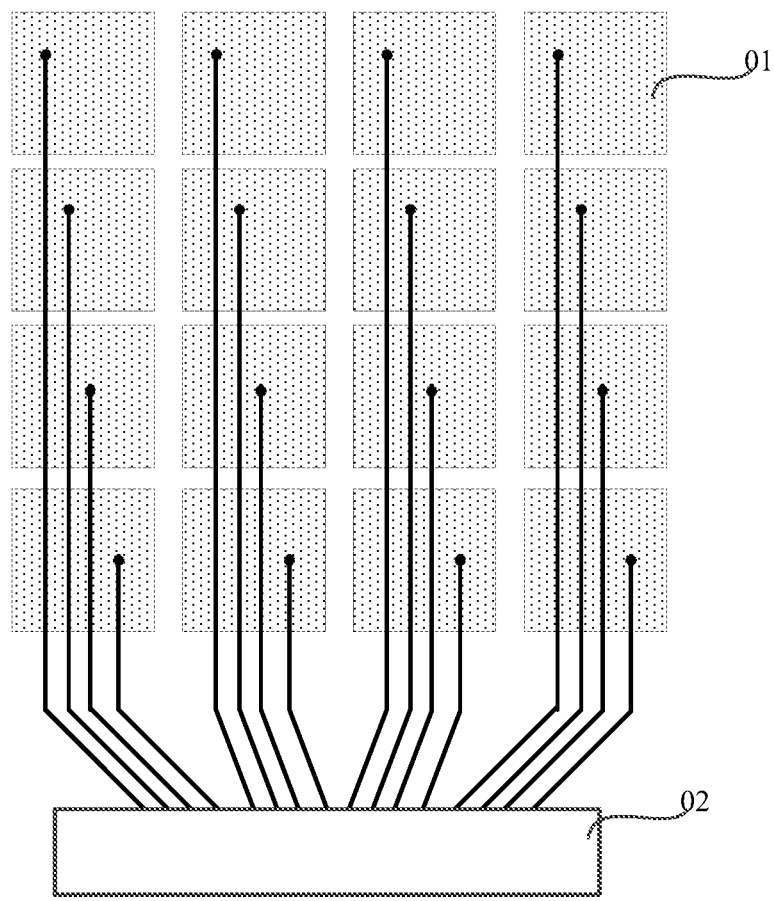
FIG. 1 is a planar view of a touch substrate.

REFERENCE SIGN LIST 01 touch electrode
02 driving chip
03 display functional layer
04 buffer layer
05 insulation layer
06 metal wiring layer
07 functional electrode layer
071 touch electrode
072 fingerprint identification electrode
08 transparent conductive layer
081 transparent metal oxide conductive layer
082 metal layer
083 transparent metal oxide conductive layer
084 transparent electrode block
09 passivation layer
10 black matrix
11, 12 overcoat layer
13 sub-pixel
14 via hole

DETAILED DESCRIPTION

In order to make the objects, the technical solutions and the advantages of the present disclosure more apparent, the present disclosure will be described hereinafter in a clear and complete manner in conjunction with the drawings and embodiments.

An object of the present disclosure is to provide a display panel, a manufacturing method thereof, and a display device, so as to improve the signal-to-noise ratio.

The present disclosure provides in some embodiments a display panel, including: a display functional layer, the display functional layer including a driving circuitry and a light-emitting unit, the driving circuitry including a gate insulation layer, a gate metal layer, a source/drain metal layer and an interlayer insulation layer, and the light-emitting unit including an anode, a cathode and a light-emitting layer located between the anode and the cathode; a functional electrode layer located at a side of the display functional layer; and a transparent conductive layer located at a side of the functional electrode layer away from the display functional layer and electrically coupled to the functional electrode layer, the transparent conductive layer at least including a metal layer and a transparent metal oxide conductive layer, and a thickness of the transparent metal oxide conductive layer being greater than a thickness of the metal layer.

According to the embodiments of the present disclosure, the functional electrode layer is located outside the display functional layer, so as to ensure that a distance between the functional electrode layer and a user's finger is small when a touch function or a fingerprint identification function is achieved through the functional electrode layer, thereby to improve a signal-to-noise ratio of a sensing signal. In addition, the transparent conductive layer directly and electrically coupled to the functional electrode layer is arranged at a side of the functional electrode layer away from the display functional layer, and due to a light transmission characteristic of the transparent conductive layer, a display function of the display functional layer is not adversely affected, so the transparent conductive layer is provided with a large area. As a result, when the transparent conductive layer is electrically coupled to the functional electrode layer, it is able to indirectly increase an area of the functional electrode layer, thereby to increase an intensity of the sensing signal.

The functional electrode layer is made of metal or any other conductive materials, such as transparent conductive metal oxide or graphene.

In some embodiments of the present disclosure, the transparent conductive layer includes the transparent metal oxide conductive layer, the metal layer and the transparent metal oxide conductive layer laminated one on another: or the transparent conductive layer includes the transparent metal oxide conductive layer and the metal layer laminated one on another, and the metal layer is located at a side of the transparent metal oxide conductive layer close to the display functional layer.

In some embodiments of the present disclosure, the display panel further includes: a metal wiring layer located at a light-exiting side of the display functional layer and including a plurality of metal lines: and an insulation layer located at a side of the metal wiring layer away from the display functional layer. The functional electrode layer is located at a side of the insulation layer away from the display functional layer, and the functional electrode layer is electrically coupled to each metal line through a via hole penetrating through the insulation layer.

The functional electrode layer includes a plurality of touch electrodes and/or a plurality of fingerprint identification electrodes. In a possible embodiment of the present disclosure, the functional electrode layer merely includes a plurality of touch electrodes, so as to enable the display panel to achieve the touch function. In another possible embodiment of the present disclosure, the functional electrode layer merely includes a plurality of fingerprint identification electrodes, so as to enable the display panel to achieve the fingerprint identification function. In yet another possible embodiment of the present disclosure, the functional electrode layer includes a plurality of fingerprint identification electrodes and a plurality of touch electrodes arranged at different layers, so as to enable the display panel to achieve the touch function and the fingerprint identification function at the same time.

As shown in FIG. 1, the functional electrode layer includes a plurality of touch electrodes 01 independent of each other, each touch electrode 01 is electrically coupled to the metal line through the via hole penetrating through the insulation layer, the metal lines are coupled to a driving chip 02, and an integrated touch function of the display panel is achieved through the functional electrode layer. In order to prevent the display function of the display functional layer from being adversely affected, the touch electrode is a metal grid, i.e., the functional electrode layer includes a plurality of metal grid electrode blocks independent of each other, and each metal grid electrode block is a touch electrode. The transparent conductive layer includes a plurality of transparent electrode blocks independent of each other and corresponding to the metal grid electrode blocks respectively, each transparent electrode block is electrically coupled to the corresponding metal grid electrode block, and an orthogonal projection of the touch electrode onto the display functional layer is within an orthogonal projection of the corresponding transparent electrode block onto the display functional layer. When the touch function is achieved, the touch electrode is located outside the display functional layer, and the distance between the touch electrode and the user's finger is small, so as to increase a signal-to-noise ratio of a touch sensing signal and prevent touch sensing from being adversely affected by a display screen signal. In addition, the touch electrode is electrically coupled to the transparent conductive layer, so it is able to increase an area of the touch electrode indirectly, thereby to further increase the intensity of the touch sensing signal and improve the touch accuracy.

In some embodiments of the present disclosure, the functional electrode layer includes P touch electrodes arranged in an array form, the metal wiring layer includes P metal lines, and each of the touch electrodes is coupled to a respective one of the metal lines, where P is an integer greater than 1.

Figure 2:
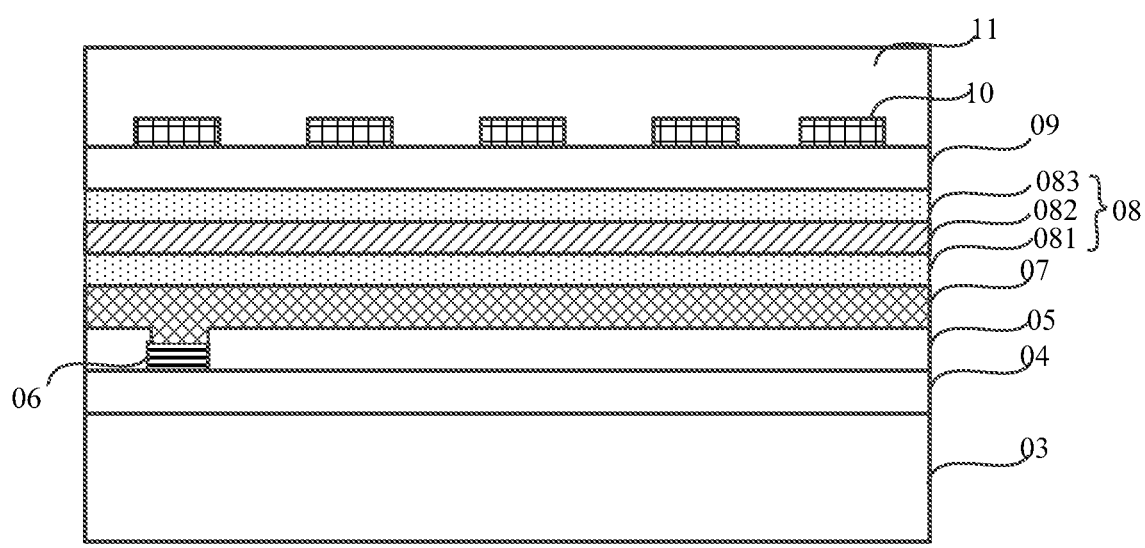
FIG. 2 is a sectional view of a display panel according to one embodiment of the present disclosure.

In the embodiments of the present disclosure, as shown in FIG. 2, the display panel includes: the display functional layer 03: a buffer layer 04 located on the display functional layer 03: the metal wiring layer 06 located on the buffer layer 04, the metal wiring layer 06 including a plurality of metal lines, and the metal lines being extraction lines of the touch electrodes: the insulation layer 05 covering the metal wiring layer 06: the functional electrode layer 07 located on the insulation layer 05, the functional electrode layer 07 being of a metal-grid shape and being periodically interrupted to form a plurality of metal grid touch electrodes independent of each other, and each touch electrode being coupled to the metal line through the via hole penetrating through the insulation layer 05: the transparent conductive layer 08 electrically coupled to the functional electrode layer 07: a passivation layer 09 located on the transparent conductive layer 08: a black matrix 10 located on the passivation layer 09, an orthogonal projection of the metal line onto the display functional layer being within an orthogonal projection of the black matrix onto the display functional layer, so as to enable the black matrix to shield the metal lines, thereby to prevent the display function of the display functional layer from being adversely affected due to the reflection of the metal lines: and an overcoat layer 11 for protecting the display panel.

The metal line is of a single-layer structure or a multi-layer structure. In some embodiments of the present disclosure, the metal line is of a Titanium (Ti)/Aluminium (Al)/Ti laminated structure, so as to achieve good electrical conductivity. The insulation layer 05 is made of an inorganic insulation material or an organic insulation material, e.g., silicon nitride. The functional electrode layer 07 is of a single-layer structure or a multi-layer structure. In some embodiments of the present disclosure, the functional electrode layer 07 is of a Ti/Al/Ti laminated structure, so as to achieve good electrical conductivity.

Due to the light transmission characteristic of the transparent conductive layer 08, the display function of the display functional layer is not adversely affected, so the transparent conductive layer is provided with a large area. When the transparent conductive layer is electrically coupled to the touch electrode, it is able to indirectly increase an area of the touch electrode, thereby to further increase the intensity of the touch sensing signal. Of course, in order to prevent different touch electrodes from being coupled to each other through the transparent conductive layer 08, the transparent conductive layer 08 needs to be divided into a plurality of transparent electrode blocks independent of each other, as shown in FIG. 3, and each transparent electrode block 084 is electrically coupled to the corresponding touch electrode 071.

Figure 3:
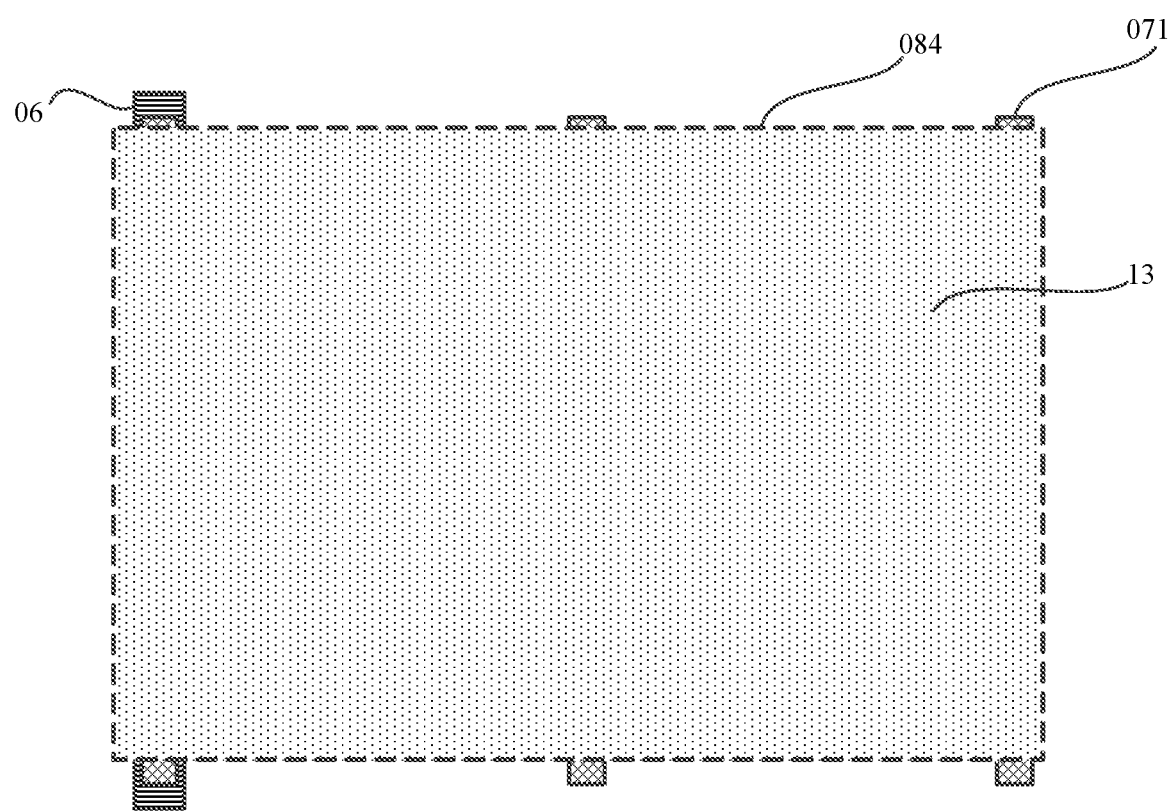
FIG. 3 is a planar view of the display panel according to one embodiment of the present disclosure.

As shown in FIG. 3, the display functional layer includes a plurality of sub-pixels 13, the orthogonal projection of the touch electrode 071 onto the display functional layer covers at least one sub-pixel 13, and an orthogonal projection of the metal grid onto the display functional layer is located between adjacent sub-pixels.

The transparent conductive layer 08 includes a transparent metal oxide conductive layer 081, a metal layer 082 and a transparent metal oxide conductive layer 083 laminated one on another, and in order to ensure the light transmittance of the transparent conductive layer 08, the thickness of the metal layer 082 ranges from 10 Å to 250 Å.

In some embodiments of the present disclosure, a ratio of the thickness of the transparent metal oxide conductive layer to the thickness of the metal layer ranges from 5 to 7.

In some embodiments of the present disclosure, the transparent metal oxide conductive layer is made of indium tin oxide (ITO) or indium zinc oxide (IZO) with a thickness of about 700 Å, such as 500 Å to 700 Å. The metal layer 082 is made of a metal with good conductivity, such as Argentum (Ag) and Ti, and the thickness of the metal layer 082 is about 100 Å. In the embodiments of the present disclosure, the transparent conductive layer 08 is of an ITO/Ti/ITO laminated structure.

In order to reduce the reflectivity at a surface of the OLED display functional layer, a circular polarizer is usually attached at the light-exiting side of the OLED display functional layer in the related art. At this time, an overall thickness of the display panel is too large, and the display panel is adversely affected when it is applied to flexible display and folded repeatedly. In the embodiments of the present disclosure, the thickness of the transparent metal oxide conductive layer 081, the thickness of the metal layer 082 and the thickness of the transparent metal oxide conductive layer 083 are adjusted in such a manner that the light transmittance of the transparent conductive layer is not greater than 60%, e.g. 40% to 60%, so as to reduce the reflectivity at the surface of the display functional layer without any circular polarizer at the light-exiting side of the display functional layer, thereby to reduce the overall thickness of the display panel, and enable the display panel to be folded repeatedly.

The transparent metal oxide conductive layer 083 and the transparent metal oxide conductive layer 081 are arranged on opposite sides of the metal layer 082 to form the laminated structure, so as to reduce the reflectivity of the display panel. In addition, a thickness of the passivation layer 09 is adjusted in such a manner that the passivation layer 09 and the transparent conductive layer 08 form an interference anti-reflection structure to reduce the reflectivity on the surface of the OLED display functional layer. Furthermore, the passivation layer 09 is used to prevent water and oxygen from corroding the functional film layer in the display panel. At this time, the passivation layer 09 is made of an inorganic insulation material, such as silicon nitride, silicon oxide or a combination thereof, and the thickness of the passivation layer 09 is about 800 Å, such as 600 Å to 2000 Å.

A thickness of the overcoat layer 11 is about 2 μm, and the overcoat layer 11 is made of a material with a low refractive index, e.g., from 1.4 to 1.6. The reflectivity of the surface of the display substrate n=[(n1−n2)/(n1+n2)]$^2$, where n1 is a refractive index of an outer layer, and n2 is a refractive index of air. The refractive index at the surface of the transparent conductive layer is about 2.0, so a material with a low refractive index needs to be formed on the surface of the transparent conductive layer so as to reduce the reflection at an interface with air.

Figure 4:
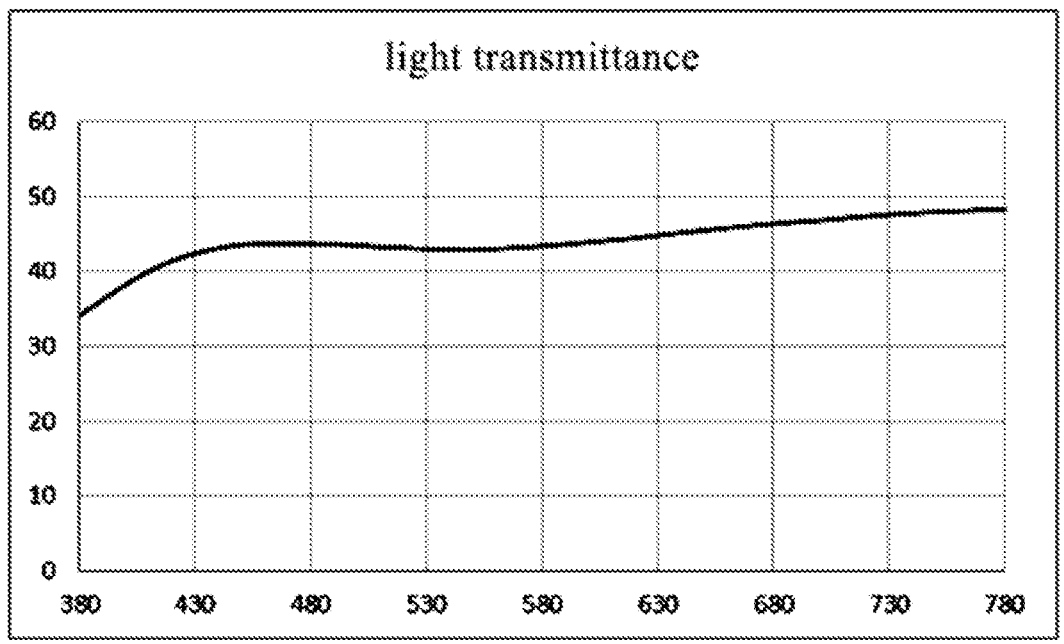
FIG. 4 is a curve diagram of a light transmittance of the display panel according to one embodiment of the present disclosure.

In some embodiments of the present disclosure, when the transparent conductive layer 08 is of an ITO/Ti/ITO laminated structure, a thickness of an ITO layer is 700 Å and a thickness of a Ti layer is 100 Å, FIG. 4 shows a light transmittance curve of a semi-transparent structure formed by the transparent conductive layer 08.

In the embodiments of the present disclosure, the light transmittance of the semi-transparent structure formed by the transparent conductive layer 08 is about 40% to 60%, the surface reflectivity of the black matrix is about 3%, and the reflectivity of a conventional OLED display functional layer is about 46%. According to the structure in the embodiments of the present disclosure, the reflectivity of the display panel is reduced to 5% and the display panel is provided with the touch function at the same time.

In some embodiments of the present disclosure, the functional electrode layer includes a plurality of fingerprint identification electrodes independent of each other, and each fingerprint identification electrode is coupled to the metal line through the via hole penetrating through the insulation layer, so as to achieve the fingerprint identification function. In order to prevent the display function of the display functional layer from being adversely affected, the fingerprint identification electrode is a metal grid, i.e., the functional electrode layer includes a plurality of metal grid electrode blocks independent of each other, and each metal grid electrode block is a fingerprint identification electrode. The transparent conductive layer includes a plurality of transparent electrode blocks independent of each other and corresponding to the metal grid electrode blocks respectively, each transparent electrode block is electrically coupled to the corresponding metal grid electrode block, and an orthogonal projection of the fingerprint identification electrode onto the display functional layer is within an orthogonal projection of the corresponding transparent electrode block onto the display functional layer. When the fingerprint identification function is achieved, the fingerprint identification electrode is located outside the display functional layer, and a distance between the fingerprint identification electrode and the user's finger is small, so it is able to increase a signal-to-noise ratio of a fingerprint identification sensing signal is improved, and prevent the fingerprint identification sensing from being adversely affected by the display screen signal. In addition, the fingerprint identification electrode is electrically coupled to the transparent conductive layer, so it is able to increase an area of the fingerprint identification electrode indirectly, and further increase the intensity of the fingerprint identification sensing signal, thereby to identify the fingerprint signal more easily and improve fingerprint identification accuracy.

Figure 5:
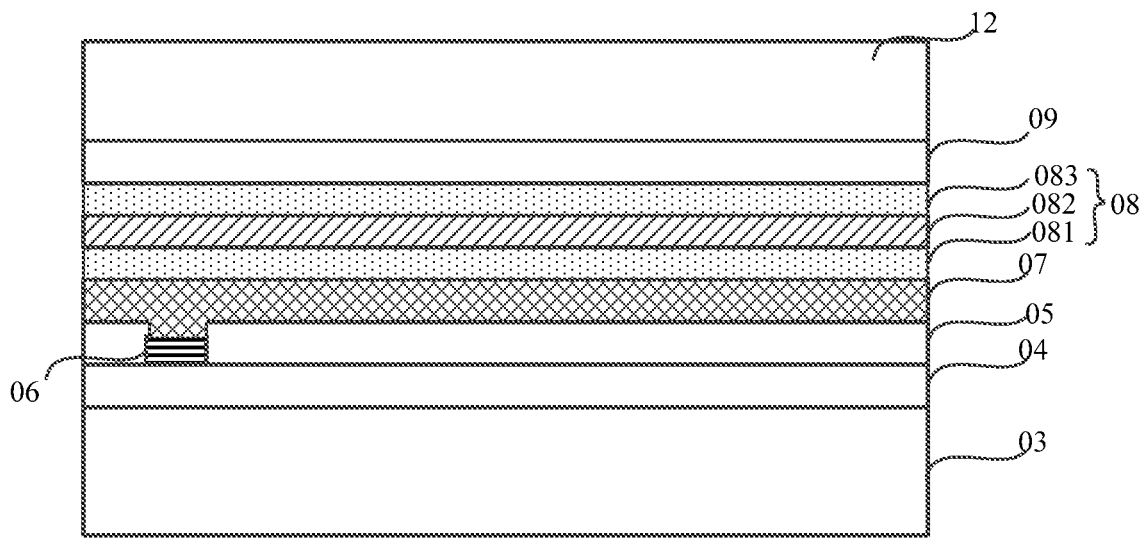
FIG. 5 is another sectional view of the display panel according to one embodiment of the present disclosure.

In the embodiments of the present disclosure, as shown in FIG. 5, the display panel includes: the display functional layer 03: a buffer layer 04 located on the display functional layer 03: the metal wiring layer 06 located on the buffer layer 04, the metal wiring layer 06 including a plurality of metal lines, and the metal lines being lead-out lines of the touch electrode: the insulation layer 05 covering the metal wiring layer 06: the functional electrode layer 07 located on the insulation layer 05, the functional electrode layer 07 being of a metal-grid shape and being periodically interrupted to form a plurality of metal grid fingerprint identification electrodes independent of each other, and each fingerprint identification electrode being coupled to the metal line through the via hole penetrating through the insulation layer 05: the transparent conductive layer 08 electrically coupled to the functional electrode layer 07: a passivation layer 09 located on the transparent conductive layer 08: and an overcoat layer 12 for protecting the display panel.

The metal line is of a single-layer structure or a multi-layer structure. In some embodiments of the present disclosure, the metal line is of a Ti/Al/Ti laminated structure, so as to achieve good electrical conductivity. The insulation layer 05 is made of an inorganic insulation material or an organic insulation material, e.g., silicon nitride. The functional electrode layer 07 is of a single-layer structure or a multi-layer structure. In some embodiments of the present disclosure, the functional electrode layer 07 is of a Ti/Al/Ti laminated structure, so as to achieve good electrical conductivity.

Due to the light transmission characteristic of the transparent conductive layer 08, the display function of the display functional layer is not adversely affected, so the transparent conductive layer is provided with a large area. When the transparent conductive layer is electrically coupled to the touch electrode, it is able to indirectly increase an area of the touch electrode, thereby to further increase the intensity of the touch sensing signal. Of course, in order to prevent different touch electrodes from being coupled to each other through the transparent conductive layer 08, the transparent conductive layer 08 needs to be divided into a plurality of transparent electrode blocks independent of each other, as shown in FIG. 6, and each transparent electrode block 084 is electrically coupled to the corresponding fingerprint identification electrode 072.

Figure 6:
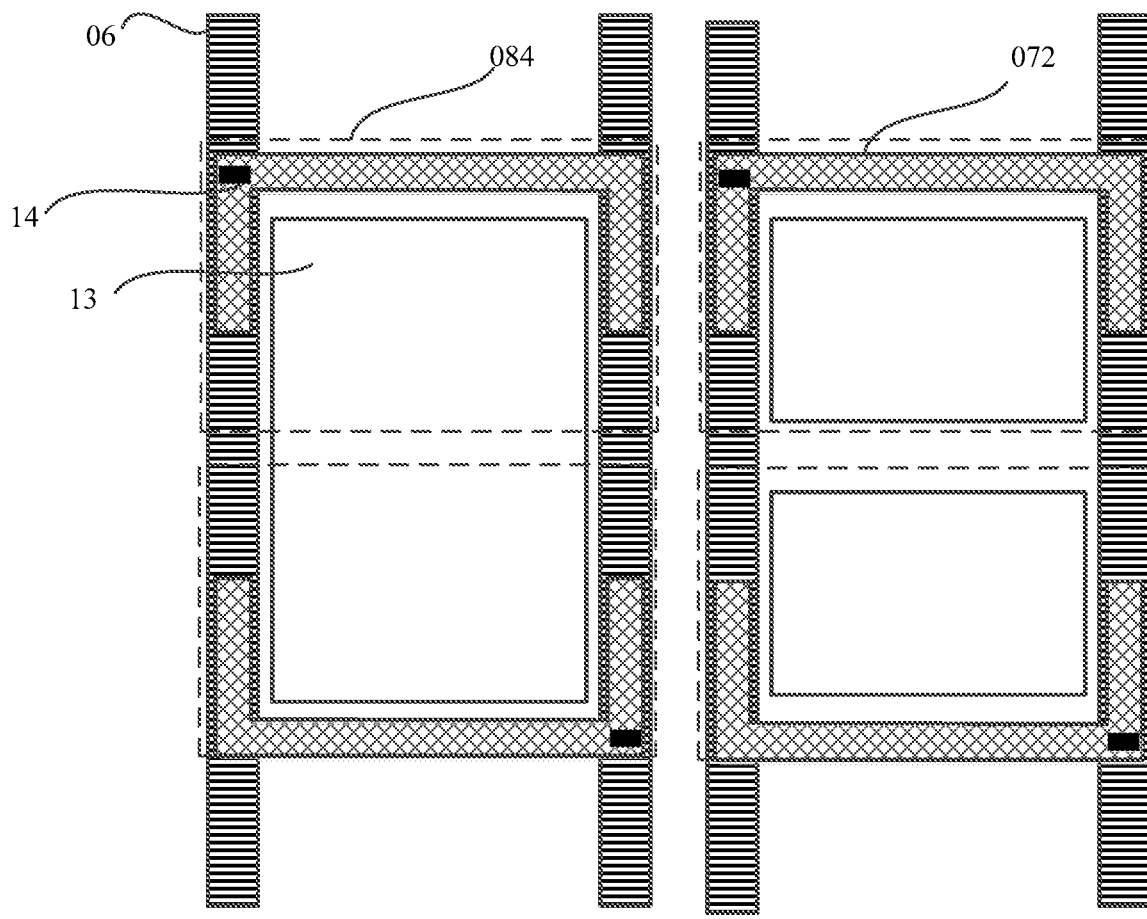
FIG. 6 is another planar view of the display panel according to one embodiment of the present disclosure.

As shown in FIG. 6, the display functional layer includes a plurality of sub-pixels 13, and the orthogonal projection of the fingerprint identification electrode 072 onto the display functional layer covers one sub-pixel 13 or a part of one sub-pixel 13. When the fingerprint identification electrode 072 is the metal grid, an orthogonal projection of the metal grid onto the display functional layer is located between adjacent sub-pixels.

In order to improve a resolution of the fingerprint identification, sufficient fingerprint identification electrodes 072 need to be provided, so a single fingerprint identification electrode 072 is provided with a smaller area. As shown in FIG. 6, the area of the single fingerprint identification electrode 072 is merely equal to an area of one or half of the sub-pixel 13, so the intensity of the fingerprint identification signal is very small. In the embodiments of the present disclosure, the transparent electrode block 084 is electrically coupled to the fingerprint identification electrode 072 to increase the area of the fingerprint identification electrode 072 indirectly, so it is able to ensure the intensity of the fingerprint identification signal and the fingerprint identification accuracy even if the area of a single fingerprint identification electrode is small.

As shown in FIG. 6, the fingerprint identification electrode 072 is coupled to the metal wiring layer through the via hole 14. The functional electrode layer includes the fingerprint identification electrodes arranged in M columns, the metal wiring layer includes 2M metal lines extending in a column direction, even-numbered fingerprint identification electrodes in an $i^{th}$ column are coupled to a $(2i)^{th}$ metal line, and odd-numbered fingerprint identification electrodes in the $i^{th}$ column are coupled to a $(2i-1)^{th}$ metal line, or the even-numbered fingerprint identification electrodes in the $i^{th}$ column are coupled to the $(2i-1)^{th}$ metal line, and the odd-numbered fingerprint identification electrodes in the $i^{th}$ column are coupled to the $(2i)^{th}$ metal line, where i is an integer greater than or equal to 1 and less than or equal to M.

Figure 7:
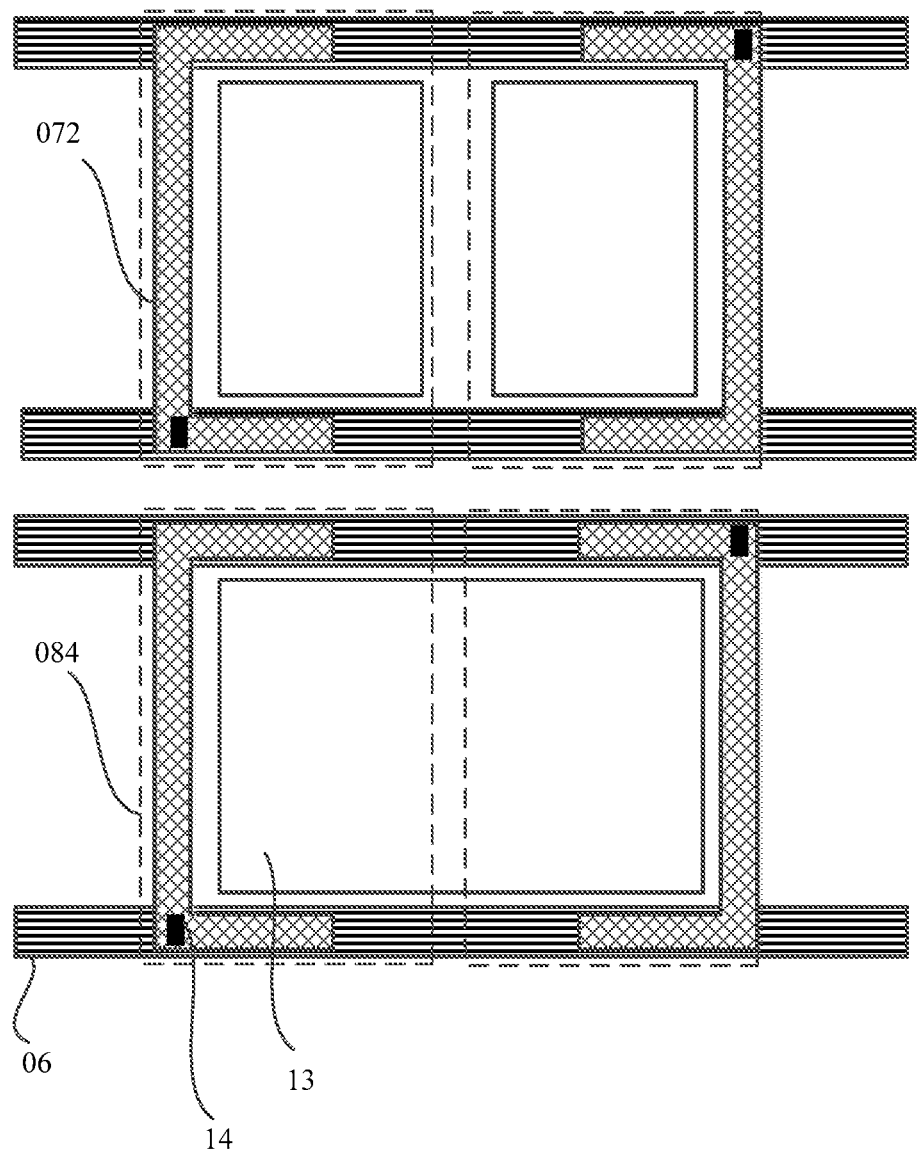
FIG. 7 is yet another planar view of the display panel according to one embodiment of the present disclosure.

Alternatively, as shown in FIG. 7, the functional electrode layer includes the fingerprint identification electrodes arranged in N rows, the metal wiring layer includes 2N metal lines extending in a row direction, even-numbered fingerprint identification electrodes in a $j^{th}$ row are coupled to a $(2j)^{th}$ metal line, and odd-numbered fingerprint identification electrodes in the $j^{th}$ row are coupled to a $(2j-1)^{th}$ metal line, or the even-numbered fingerprint identification electrodes in the $j^{th}$ row are coupled to the $(2j-1)^{th}$ metal line, and the odd-numbered fingerprint identification electrodes in the $j^{th}$ row are coupled to the $(2j)^{th}$ metal line, where j is an integer greater than or equal to 1 and less than or equal to N.

In the embodiments of the present disclosure, the transparent conductive layer 08 includes the transparent metal oxide conductive layer 081, the metal layer 082 and the transparent metal oxide conductive layer 083 laminated one on another, and in order to ensure the light transmittance of the transparent conductive layer 08, the thickness of the metal layer 082 ranges from 10 Å to 250 Å.

In some embodiments of the present disclosure, a ratio of the thickness of the transparent metal oxide conductive layer to the thickness of the metal layer ranges from 5 to 7.

In some embodiments of the present disclosure, the transparent metal oxide conductive layer is made of ITO or IZO with a thickness of about 700 Å, such as 500 Å to 700 Å. The metal layer 082 is made of a metal with good conductivity, such as Ag and Ti, and the thickness of the metal layer 082 is about 10 Å to 250 Å. In the embodiments of the present disclosure, the transparent conductive layer 08 is of an ITO/Ti/ITO laminated structure.

In order to reduce the reflectivity at a surface of the OLED display functional layer, a circular polarizer is usually attached at the light-exiting side of the OLED display functional layer in the related art. At this time, an overall thickness of the display panel is too large, and the display panel is adversely affected when it is applied to flexible display and folded repeatedly. In the embodiments of the present disclosure, the thickness of the transparent metal oxide conductive layer 081, the thickness of the metal layer 082 and the thickness of the transparent metal oxide conductive layer 083 are adjusted in such a manner that the light transmittance of the transparent conductive layer is not greater than 60%, e.g. 40% to 60%, so as to reduce the reflectivity at the surface of the display functional layer without any circular polarizer at the light-exiting side of the display functional layer, thereby to reduce the overall thickness of the display panel, and enable the display panel to be folded repeatedly.

The transparent metal oxide conductive layer 083 and the transparent metal oxide conductive layer 081 are arranged on opposite sides of the metal layer 082 to form the laminated structure, so as to reduce the reflectivity of the display panel.

In addition, In addition, a thickness of the passivation layer 09 is adjusted in such a manner that the passivation layer 09 and the transparent conductive layer 08 form an interference anti-reflection structure to reduce the reflectivity on the surface of the OLED display functional layer. Furthermore, the passivation layer 09 is used to prevent water and oxygen from corroding the functional film layer in the display panel. At this time, the passivation layer 09 is made of an inorganic insulation material, such as silicon nitride, silicon oxide or a combination thereof, and the thickness of the passivation layer 09 is about 800 Å, such as 600 Å to 2000 Å.

A thickness of the overcoat layer 11 is about 2 μm, and the overcoat layer 11 is made of a material with a low refractive index, e.g., from 1.4 to 1.6. The reflectivity of the surface of the display substrate $n=[(n1-n2)/(n1+n2)]^2$, where n1 is a refractive index of an outer layer, and n2 is a refractive index of air. The refractive index at the surface of the transparent conductive layer is about 2.0, so a material with a low refractive index needs to be formed on the surface of the transparent conductive layer so as to reduce the reflection at an interface with air.

In some embodiments of the present disclosure, when the transparent conductive layer 08 is of an ITO/Ti/ITO laminated structure, a thickness of an ITO layer is 700 Å and a thickness of a Ti layer is 100 Å, FIG. 4 shows a light transmittance curve of a semi-transparent structure formed by the transparent conductive layer 08. In the embodiments of the present disclosure, the light transmittance of the semi-transparent structure formed by the transparent conductive layer 08 is about 40% to 60%, the surface reflectivity of the black matrix is about 3%, and the reflectivity of a conventional OLED display functional layer is about 46%.

According to the structure in the embodiments of the present disclosure, the reflectivity of the display panel is reduced to 5% and the display panel is provided with the fingerprint identification function at the same time.

The present disclosure further provides in some embodiments a display device, which includes the above-mentioned display panel and a driving chip coupled to the functional electrode layer through the metal lines.

The display device includes, but not limited to, a radio frequency unit, a network module, an audio output unit, an input unit, a sensor, a display unit, a user input unit, an interface unit, a memory, a processor, and a power source. It should be appreciated that, the display device may not be limited thereto, i.e., it may include more or fewer members, or some members may be combined, or the members may be arranged in different modes. In the embodiments of the present disclosure, the display device may include, but not limited to, display, mobile phone, flat-panel computer, television, wearable electronic device or navigator.

The display device may be any product or member having a display function, such as a television, a display, a digital photo frame, a mobile phone and a tablet computer. The display device further includes a flexible circuit board, a printed circuit board and a back plate.

The present disclosure further provides in some embodiments a method for manufacturing a display panel, which includes: providing a display functional layer, the display functional layer including a driving circuitry and a light-emitting unit, the driving circuitry including a gate insulation layer, a gate metal layer, a source/drain metal layer and an interlayer insulation layer, and the light-emitting unit including an anode, a cathode and a light-emitting layer located between the anode and the cathode: forming a functional electrode layer at a side of the display functional layer: and forming a transparent conductive layer at a side of the functional electrode layer away from the display functional layer and electrically coupled to the functional electrode layer, the transparent conductive layer at least including a metal layer and a transparent metal oxide conductive layer, and a thickness of the transparent metal oxide conductive layer being greater than a thickness of the metal layer.

According to the embodiments of the present disclosure, the functional electrode layer is located outside the display functional layer, so as to ensure that a distance between the functional electrode layer and a user's finger is small when a touch function or a fingerprint identification function is achieved through the functional electrode layer, thereby to improve a signal-to-noise ratio of a sensing signal. In addition, the transparent conductive layer directly and electrically coupled to the functional electrode layer is arranged at a side of the functional electrode layer away from the display functional layer, and due to a light transmission characteristic of the transparent conductive layer, a display function of the display functional layer is not adversely affected, so the transparent conductive layer is provided with a large area. As a result, when the transparent conductive layer is electrically coupled to the functional electrode layer, it is able to indirectly increase an area of the functional electrode layer, thereby to increase an intensity of the sensing signal.

The functional electrode layer is made of metal or any other conductive materials, such as transparent conductive metal oxide or graphene.

In some embodiments of the present disclosure, the method further includes: forming a metal wiring layer at a light-exiting side of the display functional layer, the metal wiring layer including a plurality of metal lines: and forming an insulation layer at a side of the metal wiring layer away from the display functional layer. The forming the functional electrode layer includes forming the functional electrode layer at a side of the insulation layer away from the display functional layer, and the functional electrode layer is electrically coupled to the metal lines through via holes penetrating through the insulation layer.

In some embodiments of the present disclosure, as shown in FIG. 1, the functional electrode layer includes a plurality of touch electrodes 01 independent of each other, each touch electrode 01 is electrically coupled to the metal line through the via hole penetrating through the insulation layer, the metal lines are coupled to a driving chip 02, and an integrated touch function of the display panel is achieved through the functional electrode layer. In order to prevent the display function of the display functional layer from being adversely affected, the touch electrode is a metal grid, i.e., the functional electrode layer includes a plurality of metal grid electrode blocks independent of each other, and each metal grid electrode block is a touch electrode. The transparent conductive layer includes a plurality of transparent electrode blocks independent of each other and corresponding to the metal grid electrode blocks respectively, each transparent electrode block is electrically coupled to the corresponding metal grid electrode block, and an orthogonal projection of the touch electrode onto the display functional layer is within an orthogonal projection of the corresponding transparent electrode block onto the display functional layer. When the touch function is achieved, the touch electrode is located outside the display functional layer, and the distance between the touch electrode and the user's finger is small, so as to increase a signal-to-noise ratio of a touch sensing signal and prevent touch sensing from being adversely affected by a display screen signal. In addition, the touch electrode is electrically coupled to the transparent conductive layer, so it is able to increase an area of the touch electrode indirectly, thereby to further increase the intensity of the touch sensing signal and improve the touch accuracy.

When the functional electrode layer includes a plurality of touch electrodes independent of each other, the method in the embodiments of the present disclosure includes the following steps.

Step 1: providing a display functional layer, e.g., an OLED display functional layer.

Step 2: as shown in FIG. 2, forming a buffer layer 04 on the display functional layer.

The buffer layer 04 is made of an inorganic insulation material such as silicon nitride, or silicon oxide.

Step 3: depositing a metal layer on the buffer layer 04, and patterning the metal layer to form a metal wiring layer 06. The metal wiring layer 06 includes a plurality of metal lines, and the metal lines are extraction lines of the touch electrodes.

The metal line is of a single-layer structure or a multi-layer structure, and in some embodiments of the present disclosure, the metal line is of a Ti/Al/Ti laminated structure.

Step 4: forming an insulation layer 05 covering the metal wiring layer 06.

The insulation layer 05 is made of an inorganic insulation material or an organic insulation material, e.g., silicon nitride.

Step 5: depositing a metal layer on the insulation layer 05, and patterning the metal layer to form a functional electrode layer 07.

The functional electrode layer 07 is of a metal-grid shape and is periodically interrupted to form a plurality of metal grid touch electrodes independent of each other, and each touch electrode is coupled to the metal line through the via hole penetrating through the insulation layer 05. The functional electrode layer 07 is of a single-layer structure or a multi-layer structure, and in some embodiments of the present disclosure, the functional electrode layer 07 is of a Ti/Al/Ti laminated structure.

Step 6: forming a transparent conductive layer 08 electrically coupled to the functional electrode layer 07.

The transparent conductive layer 08 includes a transparent metal oxide conductive layer 081, a metal layer 082 and a transparent metal oxide conductive layer 083 laminated one on another, and in order to ensure the light transmittance of the transparent conductive layer 08, a thickness of the metal layer 082 ranges from 10 Å to 250 Å.

In some embodiments of the present disclosure, the transparent metal oxide conductive layer is made of ITO or IZO with a thickness of 700 Å, the metal layer 082 is made of a metal with good conductivity, such as Ag and Ti, and a thickness of the metal layer 082 is 100 Å. In the embodiments of the present disclosure, the transparent conductive layer 08 is of an ITO/Ti/ITO laminated structure.

Step 7: forming a passivation layer 09 covering the transparent conductive layer 08.

Step 8: forming a black matrix 10 on the passivation layer 09.

An orthogonal projection of the metal line onto the display functional layer is within an orthogonal projection of the black matrix onto the display functional layer, so as to enable the black matrix to shield the metal lines, thereby to prevent the display function of the display functional layer from being adversely affected due to the reflection of the metal lines.

Step 9: forming an overcoat layer 11.

The overcoat layer 11 is used to protect the display panel.

Due to the light transmission characteristic of the transparent conductive layer 08, the display function of the display functional layer is not adversely affected, so the transparent conductive layer is provided with a large area. When the transparent conductive layer is electrically coupled to the touch electrode, it is able to indirectly increase an area of the touch electrode, thereby to further increase the intensity of the touch sensing signal. Of course, in order to prevent different touch electrodes from being coupled to each other through the transparent conductive layer 08, the transparent conductive layer 08 needs to be divided into a plurality of transparent electrode blocks independent of each other, as shown in FIG. 3, and each transparent electrode block 084 is electrically coupled to the corresponding touch electrode 071.

In order to reduce the reflectivity at a surface of the OLED display functional layer, a circular polarizer is usually attached at the light-exiting side of the OLED display functional layer in the related art. At this time, an overall thickness of the display panel is too large, and the display panel is adversely affected when it is applied to flexible display and folded repeatedly. In the embodiments of the present disclosure, the thickness of the transparent metal oxide conductive layer 081, the thickness of the metal layer 082 and the thickness of the transparent metal oxide conductive layer 083 are adjusted in such a manner that the light transmittance of the transparent conductive layer is not greater than 60%, e.g. 40% to 60%, so as to reduce the reflectivity at the surface of the display functional layer without any circular polarizer at the light-exiting side of the display functional layer, thereby to reduce the overall thickness of the display panel, and enable the display panel to be folded repeatedly.

In some embodiments of the present disclosure, the functional electrode layer includes a plurality of fingerprint identification electrodes independent of each other, and each fingerprint identification electrode is coupled to the metal line through the via hole penetrating through the insulation layer, so as to achieve the fingerprint identification function. In order to prevent the display function of the display functional layer from being adversely affected, the fingerprint identification electrode is a metal grid, i.e., the functional electrode layer includes a plurality of metal grid electrode blocks independent of each other, and each metal grid electrode block is a fingerprint identification electrode. The transparent conductive layer includes a plurality of transparent electrode blocks independent of each other and corresponding to the metal grid electrode blocks respectively, each transparent electrode block is electrically coupled to the corresponding metal grid electrode block, and an orthogonal projection of the fingerprint identification electrode onto the display functional layer is within an orthogonal projection of the corresponding transparent electrode block onto the display functional layer. When the fingerprint identification function is achieved, the fingerprint identification electrode is located outside the display functional layer, and a distance between the fingerprint identification electrode and the user's finger is small, so it is able to increase a signal-to-noise ratio of a fingerprint identification sensing signal is improved, and prevent the fingerprint identification sensing from being adversely affected by the display screen signal. In addition, the fingerprint identification electrode is electrically coupled to the transparent conductive layer, so it is able to increase an area of the fingerprint identification electrode indirectly, and further increase the intensity of the fingerprint identification sensing signal, thereby to identify the fingerprint signal more easily and improve fingerprint identification accuracy.

When the functional electrode layer includes a plurality of fingerprint identification electrodes independent of each other, the method in the embodiments of the present disclosure includes the following steps.

Step 1: providing a display functional layer, e.g., an OLED display functional layer.

Step 2: as shown in FIG. 5, forming a buffer layer 04 on the display functional layer.

The buffer layer 04 is made of an inorganic insulation material such as silicon nitride, or silicon oxide.

Step 3: depositing a metal layer on the buffer layer 04, and patterning the metal layer to form a metal wiring layer 06. The metal wiring layer 06 includes a plurality of metal lines, and the metal lines are extraction lines of the fingerprint identification electrodes.

The metal line is of a single-layer structure or a multi-layer structure, and in some embodiments of the present disclosure, the metal line is of a Ti/Al/Ti laminated structure.

Step 4: forming an insulation layer 05 covering the metal wiring layer 06.

The insulation layer 05 is made of an inorganic insulation material or an organic insulation material, e.g., silicon nitride.

Step 5: depositing a metal layer on the insulation layer 05, and patterning the metal layer to form a functional electrode layer 07.

The functional electrode layer 07 is of a metal-grid shape and is periodically interrupted to form a plurality of metal grid fingerprint identification electrodes independent of each other, and each fingerprint identification electrode is coupled to the metal line through a via hole penetrating through the insulation layer 05. The functional electrode layer 07 is of a single-layer structure or a multi-layer structure, and in some embodiments of the present disclosure, the functional electrode layer 07 is of a Ti/Al/Ti laminated structure.

Step 6: forming a transparent conductive layer 08 electrically coupled to the functional electrode layer 07.

The transparent conductive layer 08 includes a transparent metal oxide conductive layer 081, a metal layer 082 and a transparent metal oxide conductive layer 083 laminated one on another, and in order to ensure the light transmittance of the transparent conductive layer 08, a thickness of the metal layer 082 ranges from 10 Å to 250 Å.

In the embodiments of the present disclosure, the transparent metal oxide conductive layer is made of ITO or IZO with a thickness of 700 Å, the metal layer 082 is made of a metal with good conductivity, such as Ag and Ti, and a thickness of the metal layer 082 is 100 Å. In some embodiments of the present disclosure, the transparent conductive layer 08 is of an ITO/Ti/ITO laminated structure.

Step 7: forming a passivation layer 09 covering the transparent conductive layer 08.

Step 8: coating a layer of an organic insulation material to form an overcoat layer 12 after curing.

The overcoat layer 12 is used to protect the display panel.

Due to the light transmission characteristic of the transparent conductive layer 08, the display function of the display functional layer is not adversely affected, so the transparent conductive layer is provided with a large area. When the transparent conductive layer is electrically coupled to the touch electrode, it is able to indirectly increase an area of the touch electrode, thereby to further increase the intensity of the touch sensing signal. Of course, in order to prevent different touch electrodes from being coupled to each other through the transparent conductive layer 08, the transparent conductive layer 08 needs to be divided into a plurality of transparent electrode blocks independent of each other, as shown in FIG. 6, and each transparent electrode block 084 is electrically coupled to the corresponding fingerprint identification electrode 072.

In order to improve a resolution of the fingerprint identification, sufficient fingerprint identification electrodes 072 need to be provided, so a single fingerprint identification electrode 072 is provided with a smaller area. As shown in FIG. 6, the area of the single fingerprint identification electrode 072 is merely equal to an area of one or half of the sub-pixel 13, so the intensity of the fingerprint identification signal is very small. In the embodiments of the present disclosure, the transparent electrode block 084 is electrically coupled to the fingerprint identification electrode 072 to increase the area of the fingerprint identification electrode 072 indirectly, so it is able to ensure the intensity of the fingerprint identification signal and the fingerprint identification accuracy even if the area of a single fingerprint identification electrode is small.

In order to reduce the reflectivity at a surface of the OLED display functional layer, a circular polarizer is usually attached at the light-exiting side of the OLED display functional layer in the related art. At this time, an overall thickness of the display panel is too large, and the display panel is adversely affected when it is applied to flexible display and folded repeatedly. In the embodiments of the present disclosure, the thickness of the transparent metal oxide conductive layer 081, the thickness of the metal layer 082 and the thickness of the transparent metal oxide conductive layer 083 are adjusted in such a manner that the light transmittance of the transparent conductive layer is not greater than 60%, e.g. 40% to 60%, so as to reduce the reflectivity at the surface of the display functional layer without any circular polarizer at the light-exiting side of the display functional layer, thereby to reduce the overall thickness of the display panel, and enable the display panel to be folded repeatedly.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display panel, comprising:
a display functional layer;
a functional electrode layer located at a side of the display functional layer; and
a transparent conductive layer located at a side of the functional electrode layer away from the display functional layer and electrically coupled to the functional electrode layer, the transparent conductive layer at least comprising a metal layer and a transparent metal oxide conductive layer, and a thickness of the transparent metal oxide conductive layer being greater than a thickness of the metal layer.

2. The display panel according to claim 1, wherein the transparent conductive layer comprises the transparent metal oxide conductive layer, the metal layer and the transparent metal oxide conductive layer laminated one on another; or the transparent conductive layer comprises the transparent metal oxide conductive layer and the metal layer laminated one on another, and the metal layer is located at a side of the transparent metal oxide conductive layer close to the display functional layer.

3. The display panel according to claim 1, wherein a ratio of the thickness of the transparent metal oxide conductive layer to the thickness of the metal layer ranges from 5 to 7.

4. The display panel according to claim 1, wherein the thickness of the metal layer ranges from 10 Å to 250 Å.

5. The display panel according to claim 1, further comprising:
a metal wiring layer located at a light-exiting side of the display functional layer and comprising a plurality of metal lines; and
an insulation layer located at a side of the metal wiring layer away from the display functional layer,
wherein the functional electrode layer is located at a side of the insulation layer away from the display functional layer, and the functional electrode layer is electrically coupled to each metal line through a via hole penetrating through the insulation layer.

6. The display panel according to claim 1, wherein the functional electrode layer comprises a plurality of touch electrodes and/or a plurality of fingerprint identification electrodes.

7. The display panel according to claim 6, wherein the transparent conductive layer comprises a plurality of transparent electrode blocks independent of each other, the touch electrodes correspond to the transparent electrode blocks respectively, and an orthogonal projection of each touch electrode onto the display functional layer is within an orthogonal projection of the corresponding transparent electrode block onto the display functional layer.

8. The display panel according to claim 7, wherein the touch electrode is a metal grid.

9. The display panel according to claim 8, wherein the display functional layer comprises a plurality of sub-pixels, the orthogonal projection of each touch electrode onto the display functional layer covers at least one sub-pixel, and an orthogonal projection of the metal grid onto the display functional layer is located between adjacent sub-pixels.

10. The display panel according to claim 7, wherein the functional electrode layer comprises P touch electrodes arranged in an array form, and the metal wiring layer comprises P metal lines coupled to the touch electrodes respectively, where P is an integer greater than 1.

11. The display panel according to claim 6, wherein the transparent conductive layer comprises a plurality of transparent electrode blocks independent of each other, the fingerprint identification electrodes correspond to the transparent electrode blocks respectively, and an orthogonal projection of each fingerprint identification electrode onto the display functional layer is within an orthogonal projection of the corresponding transparent electrode block onto the display functional layer.

12. The display panel according to claim 11, wherein the display functional layer comprises a plurality of sub-pixels, and an orthogonal projection of each fingerprint identification electrode onto the display functional layer covers one sub-pixel or a part of one sub-pixel.

13. The display panel according to claim 11, wherein the functional electrode layer comprises the fingerprint identification electrodes arranged in M columns, the metal wiring layer comprises 2M metal lines extending in a column direction, even-numbered fingerprint identification electrodes in an $i^{th}$ column are coupled to a $(2i)^{th}$ metal line, and odd-numbered fingerprint identification electrodes in the $i^{th}$ column are coupled to a $(2i-1)^{th}$ metal line, or the even-numbered fingerprint identification electrodes in the $i^{th}$ column are coupled to the $(2i-1)^{th}$ metal line, and the odd-numbered fingerprint identification electrodes in the $i^{th}$ column are coupled to the $(2i)^{th}$ metal line, where i is an integer greater than or equal to 1 and less than or equal to M; or the functional electrode layer comprises the fingerprint identification electrodes arranged in N rows, the metal wiring layer comprises 2N metal lines extending in a row direction, even-numbered fingerprint identification electrodes in a $j^{th}$ row are coupled to a $(2j)^{th}$ metal line, and odd-numbered fingerprint identification electrodes in the $j^{th}$ row are coupled to a $(2j-1)^{th}$ metal line, or the even-numbered fingerprint identification electrodes in the $j^{th}$ row are coupled to the $(2j-1)^{th}$ metal line, and the odd-numbered fingerprint identification electrodes in the $j^{th}$ row are coupled to the $(2j)^{th}$ metal line, where j is an integer greater than or equal to 1 and less than or equal to N.

14. The display panel according to claim 1, wherein a light transmittance of the transparent conductive layer is not greater than 60%.

15. The display panel according to claim 14, wherein the light transmittance of the transparent conductive layer ranges from 40% to 60%.

16. The display panel according to claim 1, further comprising a passivation layer located at a side of the transparent conductive layer away from the display functional layer.

17. The display panel according to claim 1, further comprising a planarization layer located at a side of the transparent conductive layer away from the display functional layer and having a refractive index of 1.4 to 1.6.

18. The display panel according to claim 1, further comprising a black matrix located at a side of the transparent conductive layer away from the display functional layer, wherein an orthogonal projection of the metal line onto the display functional layer is within an orthogonal projection of the black matrix onto the display functional layer.

19. The display panel according to claim 1, further comprising an overcoat layer located at a side of the transparent conductive layer away from the display functional layer.

20. A display device, comprising the display panel according to claim 1 and a driving chip coupled to the functional electrode layer through the metal lines.

* * * * *